UNITED STATES PATENT OFFICE.

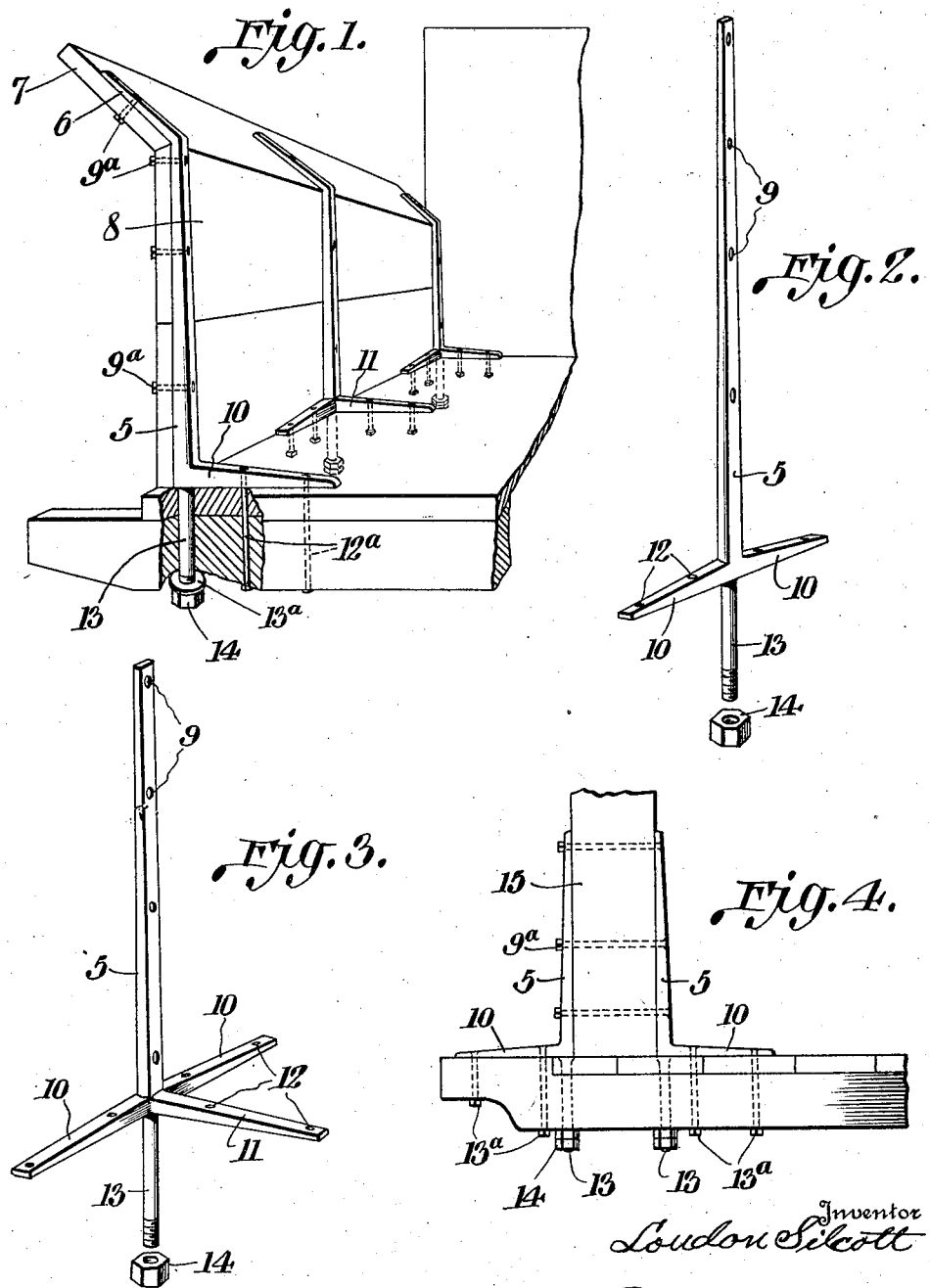

LOUDON SILCOTT, OF MOUNT VERNON, OHIO.

VEHICLE-BODY BRACE.

1,387,190.  Specification of Letters Patent.  Patented Aug. 9, 1921.

Application filed December 28, 1920. Serial No. 433,622.

*To all whom it may concern:*

Be it known that I, LOUDON SILCOTT, a citizen of the United States, residing at Mount Vernon, in the county of Knox and State of Ohio, have invented certain new and useful Improvements in Vehicle-Body Braces, of which the following is a specification.

This invention relates to braces for vehicle bodies, and pertains especially to a corner brace of novel and peculiar construction and relative arrangement of parts in one piece of metal.

The object of the invention is to provide a brace especially applicable to wagon, truck and other vehicle bodies for rigidly bracing the sides and bottom of such vehicle together by a plurality of brace arms projecting from the main body of the brace in various directions.

A further object of the invention is to provide a vehicle body brace having one or more brace arms at right angles to the main body of the brace, and to provide said body with an extension member forming a bracing post below said arms in the same plane with said body and projecting below the said arm members.

Various other objects, advantages and improved results are attainable in the manufacture and practical application of the invention as will hereinafter appear.

In the accompanying drawings forming part of this application:

Figure 1 is a perspective view of part of the rear end of a motor truck showing the application of the invention.

Fig. 2 is a perspective view of a brace, showing a pair of diverging arm members.

Fig. 3 is a similar view showing three diverging arm members.

Fig. 4 illustrates the application of a pair of braces.

The same reference characters denote the same parts throughout the several views of the drawings.

In carrying out my invention, I produce the brace complete in one piece from iron, steel or other suitable metal so that the main body 5 shall taper in thickness and have preferably a flat bendable end 6 to conform with the overhanging flange or board member 7 of the sides as 8, of a vehicle body, and said brace member has a plurality of holes 9 for suitable bolts 9ª. Obviously this main body member may be made in various lengths, thickness and shape as desired or required for various places or for various kinds of parts to be joined and braced together.

The body 5 of the brace has one or more laterally extending arms 10 projecting at right angles to and from the said body 5. Certain of these arms extend from the body opposite each other, and in certain other forms there is a third arm 11 projecting from said body member at an angle to or between the arms 10. All of these arms have a flat bottom face and a beveled upper face, and they are provided with suitable holes 12, for bolts 12ª.

Not the least important feature of my invention is the extension of the brace to form a stem member 13 having a screw end for a suitable washer 13ª, and a nut 14. Said stem projects centrally from the intersection of the body member and the arms and in the same vertical plane with the body member, and is of such length as counteract the strain on said body member and said arms, and to constitute a binding post below said member and the said arms.

Obviously the braces may be used in companion pairs for clamping and bracing an element as 15 therebetween, as shown in Fig. 4 of the drawings.

While I have shown the invention as applied to a vehicle body, it is quite applicable to agriculture machines, to ship construction, and to other devices and structures; therefore I do not wish to limit myself in its application, nor do I wish to be understood as confining the invention to any particular size, number of arms, and material, but reserve the right to make such changes and variations in the manufacture and application of the invention as may come within the scope of the appended claim.

Having thus described my invention what I claim as new and desire to secure by Letters Patent is:—

A vehicle-body brace unit consisting of a main body standard-forming portion having in continuation thereof an attenuated and bent upper end portion, a lower end portion also in alinement with said standard-forming portion, and horizontal portions extending laterally from said standard-forming portion intermediate the base thereof and the said lower end at right angles to each other, said standard-forming portion with its attenuated end and said horizontal portions being provided with fastening-receiving openings, the said lower end portion being equipped with fastening means, substantially as shown and described.

In witness whereof I hereunto set my hand in the presence of two witnesses.

LOUDON SILCOTT.

Witnesses:
 MINNIE W. SCHAEFFER,
 JAMES A. SCHAEFFER.